UNITED STATES PATENT OFFICE.

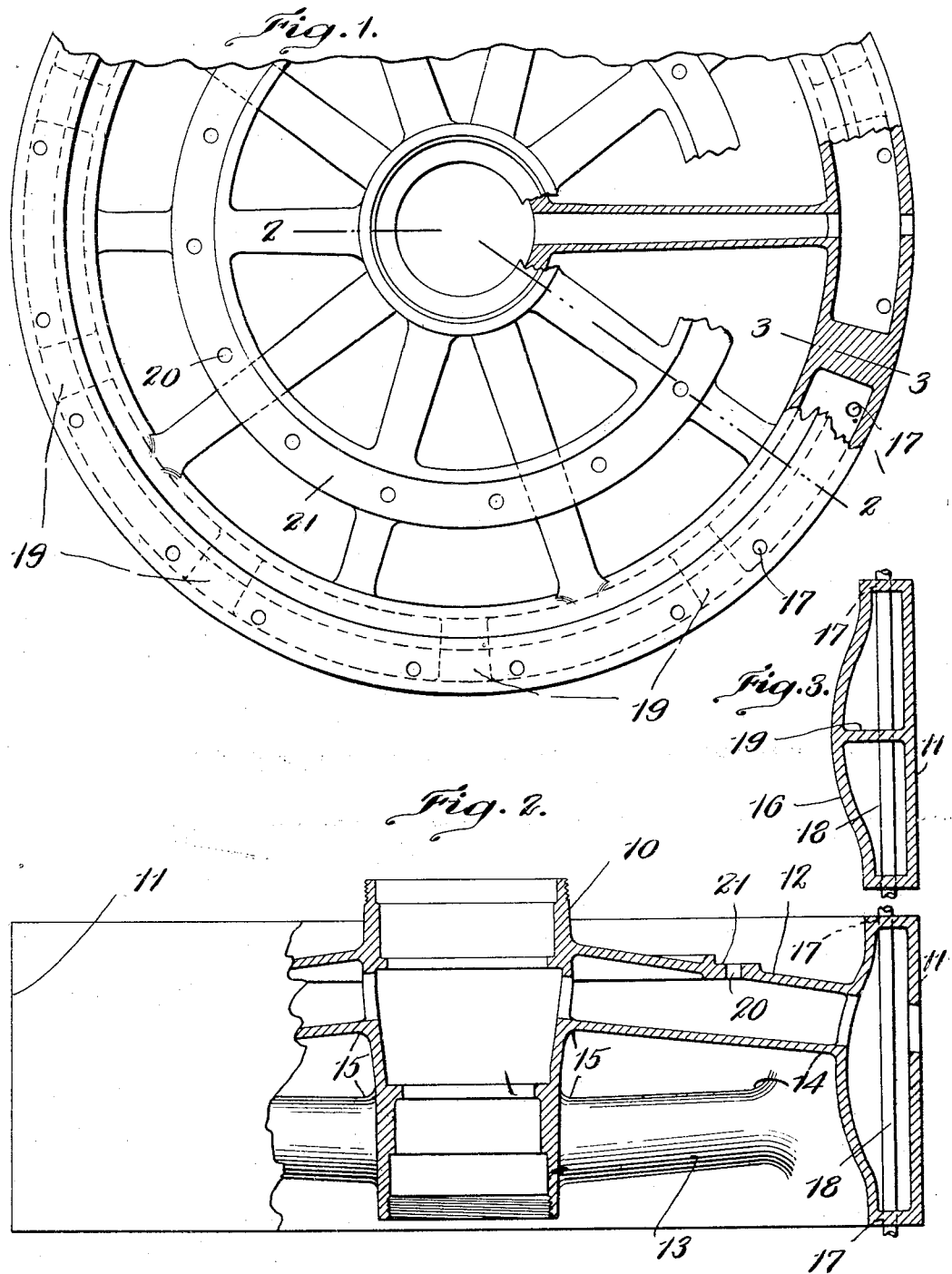

WILLIAM C. JOHNSON, OF BRAINTREE, AND JOHN W. JOHNSON, OF BOSTON, MASSA-
CHUSETTS, ASSIGNORS TO JOHNSON STEEL WHEELS CORPORATION, OF BOSTON,
MASSACHUSETTS, A CORPORATION OF MAINE.

METHOD OF MAKING WHEELS, AND RESULTING WHEEL.

1,108,096.  Specification of Letters Patent.  Patented Aug. 18, 1914.

Application filed January 2, 1913.  Serial No. 739,639.

*To all whom it may concern:*

Be it known that we, WILLIAM C. JOHNSON and JOHN W. JOHNSON, citizens of the United States, and residents, respectively, of Braintree, in the county of Norfolk and State of Massachusetts, and of Boston, in the county of Suffolk and State of Massachusetts, have invented an Improvement in Methods of Making Wheels, and Resulting Wheels, of which the following description, in connection with the accompanying drawings, is a specification, like letters on the drawings representing like parts.

The present invention relates to the production of integral cast wheels especially adapted for trucks and the like. The desirability of such a wheel from the standpoint of strength and cheapness of manufacture has long been recognized but it has not been considered practicable heretofore to produce cast-iron or steel wheels in solid castings for the reason that the internal stresses caused by unequal cooling and irregular shrinkage of the cast metal has tended to localize such great strains at vital points especially where the spokes join the hub and rim, that the spokes would either crack at these points in cooling, or would be strained beyond the critical point so that they would be fragile and easily broken in use.

The present invention has to do especially with a manner of producing a cast wheel wherein these difficulties are avoided by devising a construction which permits a kind of self-equalization and taking up of the shrinking stresses so that these are evenly distributed and dissipated, and the loss from cracking spokes reduced to a negligible one; the improved wheel also having the advantage of great structural strength and stability.

To these ends one prominent feature of the invention consists in producing at a single casting operation the complete contour of a wheel having two oppositely inclined sets of spokes, staggered in relation to each other, the spokes of the two sets joining the rim in substantially spaced apart relation and joining the hub spaced farther apart whereby cracking of the spokes on cooling is avoided, since adjacent spokes do not pull directly against each other in the same plane but exert their drawing in force on the rim in spaced apart planes so that a relative taking up between the hub and rim is permitted, it being of course understood that the actual extent of the shrinkage is one which while hardly noticeable is still sufficient to unduly strain or crack some of the spokes when no adequate relieving provision is made. In accordance with the method of our invention the wheel is evolved from the complete contour thus produced by machining the casting to finished form in any usual or suitable way.

A further important feature of the invention has to do with a hollow form of rim, coöperating with the special spoke arrangement to still further insure even and equalized shrinkage on cooling, and also specially adapted to receive holding bolts or like means for securing tires or treads to the wheel. The hollow rim is preferably formed of an arched box section combining very great strength with lightness.

The above and other objects and features of the invention will be better understood from the following detailed description taken in connection with the accompanying drawings and will be thereafter pointed out in the appended claims.

Referring to the drawings, Figure 1 is an elevation of a wheel formed in accordance with our invention, a part being sectioned away; Fig. 2 is a view mainly in section on line 2—2 of Fig. 1; and Fig. 3 is a fragmentary section on line 3—3 of Fig. 1.

In the practice of our invention we produce the complete wheel contour by a single casting operation in a specially designed mold (which mold, however, forms no part of the present invention), this wheel embracing a hub 10, a wide hollow rim 11 and two oppositely inclined sets of spokes 12, 13. The spokes of these two sets alternate with each other about the wheel and the two sets join the rim in substantially spaced apart planes as indicated at 14 in Fig. 2, joining the hub spaced still farther apart as seen at 15 by reason of their oppositely inclined diverging relation in an inward direction. By virtue of this arrangement as the mass cools and gradually hardens in the casting operation, the accompanying shrinkage is permitted without undue stress or tension on any individual spoke for the reason that adjacent spokes do not pull directly against each other in the same plane at the rim and hub, but in planes far enough apart so that the small take-up for self adjustment or compensation necessary can be accomplished by an imperceptible distortion of the rim and hub portions especially the former, it being understood that this action takes place mostly at or near the critical point when the metal is still near the molten state and relatively soft and yielding. This self adjustment of the wheel structure to the shrinkage strains is further provided for and permitted by the hollow form of the rim. Thus the drawing in shrinkage of the spokes is not exerted to its full extent on the entire mass of the rim but mainly on the inner relatively thin wall or web 16 thereof, which is capable of the minute distortion in question in its relatively plastic state without any injury or damage to any part whatever.

We are aware that it has been proposed heretofore to cast wheels with two sets of spokes joining the rim in a single plane, but we have found that by spacing the two sets apart a substantial distance at the rim as well as at the hub, along with the oppositely inclined relation, that the percentage of cracked spokes is very greatly reduced as compared with previous constructions of which we have knowledge. We desire however also to emphasize the importance of the hollow arched box rim as contributing to the most successful results in this particular. This rim of a hollow arched box section is, however, not only important in avoiding the disastrous results from shrinkage stresses, and providing an exceptionally strong yet light rim, but it has a further important function of permitting fastening means to be readily applied for holding the usual quick demountable tires or treads in place. It will be understood that with a solid cast iron rim it would be a difficult problem to mount holding bolts for the tire so that they would be out of the way and where they would not act as mud catchers, and at the same time be in position to effectively hold the tire; this for the reason that with a flat tread wheel it is impracticable to drill through the great mass of cast iron or steel to make a bolt hole through a wide rim, and if the tread be concave or of channel form the bolt would pass through the hollow space in the way of the tire. With the hollow box section rim of our invention, however, it is readily practicable to mount the holding bolts in exactly the proper position by merely drilling through the thin sides of the rim at intervals as seen at 17 to provide passages for bolts 18 that are to hold the tire in place on the flat rim, these bolts having any usual or suitable holding clips. To further strengthen the arched box section of the rim we preferably form therein at intervals web struts 19 joining the inner and outer sides of the box section and mutually interbracing them. These web struts 19 thus act as a column support to the center or arch portion of the web 16 serving to prevent collapse or crushing in of the comparatively thin arch by the loads and impacts thereon. These web struts also have a useful function in the casting operation since they afford an intermediate channel through which the molten metal may flow from the base to the arch, the feeding heads leading preferably to the outer periphery of the rim. The spokes of the wheel are shown as hollow and are preferably of oval cross section. There is a peculiar significance in the oval form of spoke with the present integral cast construction, for the reason that during the cooling process the oval form of our spoke provides a means for taking care of the shrinkage ensuing,—as the shrinkage pressure is greater through the narrower axis or flatwise and less through the longer axis giving rise to a compression on the interior sand core so that the spoke is actually less thick after cooling than the pattern provided for. This shows that the very form of the oval spoke in itself cares for the unequal stresses and strains set up during the cooling process whereas cylindrically formed hollow spokes as hitherto made have cracked owing to the fact that a cylinder cannot collapse upon itself and the cooling processes give rise to internal stresses and strains which its cylindrical form cannot dissipate. One of the sets of spokes has formed integral therewith a torque band 20 intermediate of the length of the spokes and which serves to mutually interbrace them, this band having a flat seat 21 machined thereon to receive either a driving gear or brake drum or both. The wheel contour thus produced is machined to finished form in a lathe in any usual or suitable manner.

We are aware that certain of the features of the invention may be employed with advantage apart from others and that various modifications may be resorted to without departing from the spirit of the invention and we therefore refer to the appended claims rather than to the foregoing description to indicate the scope thereof.

Having described our invention what we claim as new and desire to secure by Letters Patent is:

1. The method of making wheels which consists in casting at a single operation the complete contour of a wheel having two oppositely inclined sets of spokes, the spokes of the two sets joining the rim in substantially spaced apart relation and joining the hub spaced farther apart, and permitting the casting to cool with a self equalization and taking up of shrinkage stresses whereby cracking of spokes on cooling is avoided.

2. The method of making wheels which consists in casting at a single operation the complete contour of a wheel having two oppositely inclined sets of spokes and a hollow arched rim, the spokes of the two sets joining the inner web of said rim in substantially spaced apart relation in the direction of the wheel axis, and permitting the casting to cool gradually with a self equalization and taking up of shrinkage stresses whereby cracking of spokes on cooling is avoided.

3. The method of making wheels which consists in casting at a single operation the complete contour of a wheel having two oppositely inclined sets of hollow spokes in alternating relation about the wheel, the spokes of the two sets joining the rim in substantially spaced apart relation in the direction of the wheel axis and joining the hub spaced farther apart, and permitting the gradual cooling of the casting in a manner to permit equalization and taking-up of shrinkage stresses whereby cracking of spokes on cooling is avoided.

4. An integral cast wheel having two oppositely inclined sets of spokes joining the rim in substantially spaced apart separated planes at each side of the wheel center and joining the hub in planes farther apart, whereby shrinking stresses are dissipated.

5. An integral cast wheel having two sets of spokes with the spokes of one set staggered with respect to those of the other set, the two sets joining the rim in substantially spaced apart separated planes, and joining the hub at a farther distance apart, whereby shrinking stresses are equalized and dissipated.

6. An integral cast wheel having a relatively wide rim and hub with two sets of spokes oppositely inclined and staggered in respect to each other, said two sets joining the rim in substantially spaced apart relation at each side of the wheel center, and joining the hub at a farther distance apart for the purpose stated.

7. An integral cast wheel, comprising a relatively wide rim and hub, and two sets of oppositely inclined spokes joining the rim and hub in spaced apart relation, the junction points of the two sets with the rim being a substantial distance apart, said spokes being oblong with their longest cross section in the direction of the wheel axis, and means integral with said spokes for mutually tying and interbracing one set of the spokes together.

8. An integral cast wheel comprising a relatively wide rim and hub, said rim being of hollow arched box cross section, and two sets of oppositely inclined spokes joining the rim and hub in spaced apart relation, the junction planes of the two sets with the rim being a substantial distance apart.

9. An integral cast wheel having a relatively wide rim of hollow box cross-section with web portions joining the tread with the inner wall of the rim intermediate the width thereof.

10. An integral cast wheel comprising a hub, a relatively wide rim of hollow box cross-section, said rim being composed of relatively thin inner and outer walls with web portions joining said inner and outer walls intermediate the width of the rim and spokes joining the hub with the inner wall of the rim.

11. An integral cast wheel having a relatively wide rim of hollow box cross-section with relatively thin inner and outer walls and web portions joining said inner and outer walls intermediate the width of the rim, said outer wall forming a substantially flat tread, and the sides of the rim being drilled to receive tire bolts therethrough.

In testimony whereof, we have signed our names to this specification, in the presence of two subscribing witnesses.

WILLIAM C. JOHNSON.
JOHN W. JOHNSON.

Witnesses:
C. A. ROGERS,
LOUISE A. JORDAN.